(12) United States Patent
Mante et al.

(10) Patent No.: US 11,434,153 B2
(45) Date of Patent: *Sep. 6, 2022

(54) SEPARATION OF OZONE OXIDATION IN LIQUID MEDIA INTO THREE UNIT OPERATIONS FOR PROCESS OPTIMIZATION

(71) Applicants: L'Air Liquide, Société Anonyme pour l'Etude et l'Exploitation des Procédés Georges Claude, Paris (FR); American Air Liquide, Inc., Fremont, CA (US)

(72) Inventors: Jan Mante, Muenster (DE); Joerg Schwerdt, Kaarst (DE); Vasuhi Rasanayagam, Newark, DE (US); Rovshan Mahmudov, Newark, DE (US); Siavash Isazadeh, Cambridge, MA (US)

(73) Assignees: L'Air Liquide, Société Anonyme pour l'Etude et l'Exploitation des Procédés George Claude, Paris (FR); American Air Liquide, Inc., Fremont, CA (US)

( * ) Notice: Subject to any disclaimer, the term of this patent is extended or adjusted under 35 U.S.C. 154(b) by 341 days.

This patent is subject to a terminal disclaimer.

(21) Appl. No.: 15/938,786

(22) Filed: Mar. 28, 2018

(65) Prior Publication Data
US 2019/0300403 A1 Oct. 3, 2019

(51) Int. Cl.
*C02F 1/66* (2006.01)
*C02F 1/72* (2006.01)
(Continued)

(52) U.S. Cl.
CPC ............ *C02F 1/78* (2013.01); *C02F 1/66* (2013.01); *C02F 1/727* (2013.01);
(Continued)

(58) Field of Classification Search
CPC ........ C02F 1/66; C02F 1/78; C02F 2101/101; C02F 2101/103; C02F 2101/166;
(Continued)

(56) References Cited

U.S. PATENT DOCUMENTS 3,542,342 A  11/1970  Barron
4,252,654 A  2/1981  Leitzke et al.
(Continued)

FOREIGN PATENT DOCUMENTS

EP  0 208 253  1/1987
EP  0 561 458  9/1993
(Continued)

OTHER PUBLICATIONS

Isazdeh, S., Biosolids minimization by partial ozonation of return activated sludge: model development and bacterial population dynamics. A thesis submitted to McGill University in Partial Fulfillment of the Requirements of the Degree of Doctor of Philosophy, Department of Civil Engineering and Applied Mechanics, Montreal, Quebec, Canada, Aug. 2014, i-xxv, 1-50, 114, 169.

(Continued)

*Primary Examiner* — Akash K Varma
(74) *Attorney, Agent, or Firm* — Yan Jiang

(57) ABSTRACT

Disclosed are decoupled systems and methods for producing an oxidized liquid. The method comprises the steps of generating an ozone strong water in a mass transfer unit, mixing the ozone strong water with a process liquid in a mixing unit to form a homogeneous and gas-free mixture of the ozone strong water and the process liquid, forwarding the homogeneous and gas-free mixture to a reaction unit, and producing the oxidized liquid in the reaction unit. The method utilizes the acidic feed liquid to generate ozone dissolved in water having a higher concentration at a saturated or nearly saturated concentration compared to prior art processes at atmospheric pressure and neutral or alkaline pH.

21 Claims, 5 Drawing Sheets

(51) Int. Cl.
*C02F 1/78* (2006.01)
*C02F 101/30* (2006.01)
*C02F 101/20* (2006.01)
*C02F 101/10* (2006.01)
*C02F 101/16* (2006.01)

(52) U.S. Cl.
CPC .. *C02F 2101/101* (2013.01); *C02F 2101/103* (2013.01); *C02F 2101/166* (2013.01); *C02F 2101/203* (2013.01); *C02F 2101/30* (2013.01); *C02F 2303/04* (2013.01)

(58) Field of Classification Search
CPC ............ C02F 2101/203; C02F 2101/30; C02F 2209/06; C02F 2301/066; C02F 2303/04; C02F 1/72; C02F 1/727; C02F 1/74
USPC ......................................................... 210/760
See application file for complete search history.

(56) References Cited

U.S. PATENT DOCUMENTS

| | | | |
|---|---|---|---|
| 5,100,521 | A | 3/1992 | Schwarzl |
| 5,275,742 | A | 1/1994 | Satchell, Jr. et al. |
| 5,487,835 | A | 1/1996 | Shane |
| 5,578,205 | A | 11/1996 | Martin |
| 5,591,349 | A * | 1/1997 | Ikeda ...................... C02F 1/78 210/192 |
| 5,637,231 | A | 6/1997 | Hill et al. |
| 6,146,524 | A | 11/2000 | Story |
| 6,190,436 | B1 | 2/2001 | Ji et al. |
| 6,197,091 | B1 | 3/2001 | Ji et al. |
| 6,423,235 | B1 | 7/2002 | Shimoi et al. |
| 6,461,522 | B1 | 10/2002 | Pak et al. |
| 6,464,867 | B1 | 10/2002 | Morita et al. |
| 6,485,769 | B2 | 11/2002 | Audy et al. |
| 6,712,951 | B2 | 3/2004 | Andrews et al. |
| 7,022,225 | B1 | 4/2006 | Clawson et al. |
| 9,248,415 | B2 | 2/2016 | Osborn |
| 2002/0066717 | A1 | 6/2002 | Verhaverbeke et al. |
| 2002/0110508 | A1 | 8/2002 | Campo et al. |
| 2003/0042631 | A1 | 3/2003 | Nelson et al. |
| 2007/0034230 | A1 | 2/2007 | Gottschalk et al. |
| 2007/0047383 | A1 | 3/2007 | Williams et al. |
| 2010/0219137 | A1 | 9/2010 | Lacasse |
| 2011/0031187 | A1 | 2/2011 | Shim |
| 2011/0186495 | A1 * | 8/2011 | Robinson .................. C02F 1/78 210/198.1 |
| 2012/0164024 | A1 | 6/2012 | Uhm |
| 2012/0228396 | A1 * | 9/2012 | Osborn ..................... C02F 1/78 239/11 |
| 2013/0026110 | A1 | 1/2013 | Osborn |
| 2015/0303053 | A1 | 10/2015 | Tokoshima et al. |
| 2016/0361693 | A1 | 12/2016 | Hayashi et al. |

FOREIGN PATENT DOCUMENTS

| | | |
|---|---|---|
| RU | 2 608 144 | 1/2017 |
| RU | 2 636 076 | 11/2017 |
| WO | WO 97 14657 | 4/1997 |

OTHER PUBLICATIONS

The Linde Group, Pure water knowledge: gases and application technologies for water treatment, Linde AG, Linde Gases Division, Unterschlessheim, Germany, 2017, 1-15.

Macauley, J.J. et al., Disinfection of swine wastewater using chlorine, ultraviolet light and ozone, Water Research, Elsevier, Jan. 2006, vol. 40, No. 10, 2017-2026.

One Water Ohio, $CO_2$ injection methods and equipment of pH control, Apr. 4, 2017, retrieved from http://www.onewaterohio.org/docs/1335.the_basics_of_carbon_dioxide_injection_methods:_dirth.pdf/, 22 pages.

Rodriguez, A. et al., Ozone-based technologies in water and wastewater treatment, Hdg Env Chem Feb. 7, 2008, vol. 5, DOI: 10.1007/698_5_103, 31 pages.

Yixing Holly Technology Co, Ltd, Fine bubble disc diffuser, Apr. 20, 2017, retrieved from http://www.hollyep.com/html/Fine%20Bubble%20Diffusers_Aerators/915, 5 pages.

International Search Report and Written Opinion for corresponding PCT/US2019/023867, dated Jun. 11, 2019.

International Search Report and Written Opinion for related PCT/US2019/023888, dated Jun. 12, 2019.

International Search Report and Written Opinion for related PCT/US2019/023846, dated May 29, 2019.

Egorova, G.V. et al., Ozone solubility in water, Moscow University Chemistry Bulletin, 2015, vol. 70, No. 5, 207-210.

* cited by examiner

SEPARATION OF OZONE OXIDATION IN LIQUID MEDIA INTO THREE UNIT OPERATIONS FOR PROCESS OPTIMIZATION

FIELD OF THE INVENTION

The present invention relates to methods and apparatus for separation of ozone ($O_3$) oxidation in liquid media into three unit operations for process optimization, in particular, for separation of ozone oxidation in water into three unit operations for producing an oxidized liquid using ozone dissolved in water ("ozone strong water"). The ozone dissolved water is a pressurized gas-free high-concentrated or saturated or close to saturated (e.g. within 10% of saturation concentration, such as 5% or 1% or 0.1%) ozone dissolved water which is supersaturated if at atmospheric pressure.

BACKGROUND

Liquid oxidation is used for oxidizing a compound while in solution. In a typical liquid oxidation process, an oxygen-containing gas is incorporated into liquid or contaminated liquid medium to destroy chemical contaminants in place. It can be used to remediate a variety of organic and inorganic compounds, including some that are resistant to natural degradation. One of common oxidants used in this process is ozone ($O_3$).

Ozone based oxidation treatment is common in industrial world. Ozone is being used for oxidations of several chemical compounds in pharmaceutical industries. It may also be used for bleaching substances and for killing microorganisms in air and water sources. Most of ozone reactions happen in liquid medium. Ozone being gas, it first needs to be dissolved in water or liquid medium (so-called mass transfer) and then ozone dissolved ($dO_3$) in water or liquid medium used as an oxidant to react with compounds for oxidation. In industry, ozone dissolved water or liquid medium can be used, but is not limited to, in the following areas:

- remove micro-pollutants and oxidation of hard degradable organic components in tertiary water;
- chemically attack contaminants in water (iron, arsenic, hydrogen sulfide, nitrites, complex organics and decolonization);
- disinfect water in place of chlorine, such as, drinking water, process liquid, etc.;
- provide an aid to flocculation (agglomeration of molecules, which aids in filtration, where iron and arsenic are removed);
- manufacture chemical compounds via chemical synthesis;
- wash fresh fruits and vegetables to kill yeast, mold and bacteria; and
- bleach pulp and paper.

Currently, processes of ozone dissolution, mixing and reaction for ozone based wastewater treatment take place in a single reactor, for example, in a big concrete basin in wastewater treatment plants (WWTPs). FIG. 1 is a block diagram of a common ozone reactor system designed to have all processes, dissolution (mass transfer), mixing and reaction, in a single reactor 100. In those systems the ozone gas is usually injected via bubble diffusors or pump-injector systems into the ozone reactor. Note herein that in the single reactor 100, a mixing process may or may not occur because the ozone dissolved will react with the reactants right away in the reactor. Examples of such reactors are pilot plants manufactured by Wedeco: WWTP Regensdorf & WWTP Lausanne in Switzerland, and WWTP Emscher Verbund and WWTP Duisburg in Germany. Such a system normally has a large volume (for example, 333 $m^3$) of reactor as hydraulic retention times between 20 min and 40 min are common. Depending on the different oxidation applications usual ozone dosages range between 2 g and 200 g of ozone per $m^3$ treated process liquid. In addition, the above mentioned single reactors typically operate under atmosphere pressure, around 1 bar, the undissolved ozone and oxygen in an off-gas stream from the single reactor cannot be recovered without further pressurizing, resulting a waste of ozone and/or oxygen as well as energy consumed to generate ozone in the systems.

In general, it is known the rate of dissolution of ozone in water (also called gas-to-liquid mass transfer rate) is the rate limiting step in comparison to the rate of reaction of ozone dissolved with oxidizable constituents in a process liquid. In many industry processes (e.g., use of ozone for advanced or tertiary treatment of waste water) the dissolution of ozone in water or ozone mass transfer is the time limiting step in the entire process. In addition, in many cases, because both dissolution and reaction occurs in the same reactor, these reactors are not optimized for either dissolution or the reaction process. Thus, decoupling of dissolution, mixing and reaction of ozone-injection/ozone-application equipment would lead to process flexibility and enable operation of an ozone generator under more economical and technically optimized conditions and/or enable more efficient ozone gas recycling.

SUMMARY

There is disclosed a method for producing an oxidized liquid, the method comprising the steps of generating an ozone strong water in a mass transfer unit, mixing the ozone strong water with a process liquid in a mixing unit to form a homogeneous and gas-free mixture of the ozone strong water and the process liquid, forwarding the homogeneous and gas-free mixture to a reaction unit, and producing the oxidized liquid in the reaction unit.

There is also disclosed the method further comprises the step of injecting $CO_2$ gas or an acid into a pressurized feed liquid configured and adapted to form an acidic feed liquid and feeding the pressurized acidic feed liquid into the mass transfer unit configured and adapted to form a body of pressurized acidic liquid for generating the ozone strong water therein.

There is also disclosed the method further comprises utilizing the acidic feed liquid to generate ozone dissolved in water having a higher concentration at a saturated or nearly saturated concentration compared to prior art processes at atmospheric pressure and neutral or alkaline pH.

There is also disclosed the method further recycling ozone gas from a pressurized off-gas stream from the mass transfer unit for use as ozone feed to the mass transfer unit; and/or recycling oxygen gas from the pressurized off-gas stream from the mass transfer unit for use as oxygen feed to existing secondary wastewater treatment system.

There is also disclosed a pH value of the ozone strong water is in a range of 3 to 7.

There is also disclosed a pH value of the ozone strong water is in a range of 4 to 6.

There is also disclosed a pH value of the ozone strong water is 5.

There is also disclosed a pH value of the ozone strong water is 4.

There is also disclosed the homogeneous and gas-free mixture of the ozone strong water and the process liquid is a mixture of the ozone strong water and the process liquid with a mixing quality >approximately 95%.

There is also disclosed a pressure of the ozone strong water ranges from 2 barg to 7 barg.

There is also disclosed a pressure of the ozone strong water ranges from 3 barg to 6 barg.

There is also disclosed a pressure of the ozone strong water is about 5 barg.

There is also disclosed a pressure of the ozone strong water from the mass transfer unit is maintained until the ozone strong water is injected into the process liquid, thereby avoiding degassing.

There is also disclosed a pressure of the homogeneous and gas-free mixture in the reaction unit is approximately 1 bar or atmosphere pressure.

There is also disclosed a pressure of the homogeneous and gas-free mixture in the reaction unit is maintained the same as the pressure of the ozone strong water.

There is also disclosed a pressure of the homogeneous and gas-free mixture in the reaction unit is about 5 barg.

There is also disclosed the process liquid is composed primarily of water.

There is also disclosed the process liquid includes fresh water, tap water, process water, effluent water, municipal and industrial wastewater, wastewater already treated by the secondary treatment process, or the like.

There is also disclosed the process liquid carries components to be oxidized.

There is also disclosed the feed liquid is composed of water.

There is also disclosed the feed liquid includes fresh water, tap water, process water, effluent water, municipal and industrial wastewater, wastewater already treated by secondary treatment process, and the like.

There is also disclosed the feed liquid and the process liquid are from the same source.

There is also disclosed a steady state concentration of ozone in the ozone strong water is greater than approximately 150 mg/L.

There is also disclosed a steady state concentration of ozone in the ozone strong water ranges from approximately 150 mg/L to approximately 300 mg/L.

There is also disclosed a steady state concentration of ozone in the ozone strong water is up to approximately 200 mg/L There is also disclosed a steady state concentration of ozone in the ozone strong water is to approximately 300 mg/L.

There is also disclosed a liquid oxidation system for producing an oxidized liquid, the system comprising a mass transfer unit configured and adapted to generate an ozone strong water, a mixing unit configured and adapted to mix the ozone strong water with a process liquid to form a homogeneous and gas-free mixture of the ozone strong water and the process liquid and a reaction unit configured and adapted to receive the homogeneous and gas-free mixture and produce an oxidized liquid therein.

There is also disclosed the system further comprises a pH adjustment unit configured and adapted to form a pressurized acidic feed liquid and further configured and adapted to feed to the mass transfer unit to generate the ozone strong water under acidic conditions.

There is also disclosed $CO_2$ gas or a mineral acid is injected into a pressurized feed liquid that flows through the pH adjustment unit configured and adapted to form the pressurized acidic feed liquid.

There is also disclosed a pH of the ozone strong water is below 7.

There is also disclosed a pH of the ozone strong water is about 5.

There is also disclosed a pH of the ozone strong water is about 4.

There is also disclosed the pressure inside the mass transfer unit ranges from 2 to 7 barg.

There is also disclosed the pressure inside the mass transfer unit ranges from 3 to 6 barg.

There is also disclosed the pressure inside the mass transfer unit is about 5 barg.

There is also disclosed a method for liquid oxidation process using liquid oxidants, the method comprising the steps of mixing a liquid oxidant with a process liquid in a mixing unit to form a homogeneous and gas-free mixture of the oxidant and the process liquid, forwarding the homogeneous and gas-free mixture to a reaction unit and producing an oxidized liquid in the reaction unit.

There is also disclosed the oxidant is gaseous, further comprising the step of generating the liquid oxidant in a mass transfer unit.

Notation and Nomenclature

The following detailed description and claims utilize a number of abbreviations, symbols, and terms, which are generally well known in the art, and include:

As used herein, the indefinite article "a" or "an" should generally be construed to mean "one or more" unless specified otherwise or clear from context to be directed to a singular form.

As used herein, "about" or "around" or "approximately" in the text or in a claim means ±10% of the value stated, such as ±5% or 1%.

As used herein, "close to" or "nearly" in the text or in a claim means within 10% of the term stated, such within 5% or 1%. For example, "close to or nearly saturation concentration" refers to within 10% of saturated concentration.

As used herein, "quick dilution" or "rapid dilution" in the text or in a claim means a dilution process occurs within approximately a few seconds, such as 2 seconds or 1 second or 0.5 second.

As used herein, the terms "ozone transfer", "ozone mass transfer," and "ozone dissolution" are all intended to refer to the dissolution of ozone gas into water.

The term "ozone strong water" refers to a pressurized gas-free high concentrated or saturated or close to saturated (e.g. within 10% of saturation concentration, such as 5% or 1% or 0.1%) ozone dissolved water which is supersaturated if at atmospheric pressure. One of the applications of the ozone strong water is used as liquid oxidant.

The term "feed liquid" refers to a liquid typically composed primarily of water, such as fresh water, tap water, process water, effluent water, municipal and industrial wastewater, wastewater already treated by the secondary treatment process, or the like.

The term "process liquid" refers to a liquid typically composed primarily of water, such as fresh water, tap water, process water, effluent water, municipal and industrial wastewater, wastewater already treated by the secondary treatment process, or the like.

The term "oxidized liquid" refers to a process liquid whose non-water constituents have been oxidized partially or completely with an oxidant. Alternatively, the term "oxidized liquid" refers to a produced liquid having components that have been oxidized in a process liquid by ozone strong water. Alternatively, the term "oxidized liquid" refers in particular cases to a liquid emerging out from an oxidation process, in which various organic and inorganic constituents present in the process liquid have been converted into an oxidized form due to the action of a suitable oxidant.

The term "ozonation" refers to a water treatment process that destroys microorganisms and degrades organic and inorganic pollutants through an infusion of ozone. Ozonation is a chemical water treatment technique based on the infusion of ozone into water. Ozonation is a type of advanced oxidation process, involving the production of very reactive oxygen species able to attack a wide range of organic and inorganic compounds and all microorganisms.

The term "ozonated water" refers to a product of ozone bubbling through water that contains levels of ozone dissolved in the water.

The term "ozone dosage" is defined as the amount of ozone in gas phase fed into the water (gram/minute).

The term "supersaturated" refers to a liquid dissolution of gas which is not stable at atmospheric conditions and would degas.

The term "homogeneous" refers to a mixture of the fluids with a mixing quality >approximately 95%. Here the mixing quality is a measure of the homogeneity or uniformity of a mixture and is calculated from statistic basic variables. The coefficient of variation is the most commonly used measure. The closer this value approximates 0 the more uniform the mixture. For visualization, it is subtracted from 1 and specified in %. Thus, 100% mixing quality (or coefficient of variation=0) refers to the best mixing condition, which, however, is practically not achievable. A mixing quality >95% is deemed as technically homogeneous.

The term "gas-free" refers to a liquid without visible individual bubbles and/or without detectable turbidity caused by microbubbles.

Reference herein to "one embodiment" or "an embodiment" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Ranges may be expressed herein as from about one particular value, and/or to about another particular value. When such a range is expressed, it is to be understood that another embodiment is from the one particular value and/or to the other particular value, along with all combinations within said range.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Disclosed are methods and apparatus for separation or decoupling of oxidation process in liquid media into three unit operations for process optimization, in particular, for separation of ozone ($O_3$) oxidation process in water into three unit operations for producing an oxidized liquid with ozone strong water. The ozone strong water is a pressurized gas-free high concentrated or saturated or close to saturated (e.g. within 10% of saturation concentration, such as 5% or 1% or 0.1%) ozone dissolved water which would be supersaturated if at atmospheric pressure. One of the applications of the ozone strong water is used as liquid oxidant to produce the oxidized liquid.

Figure 2:
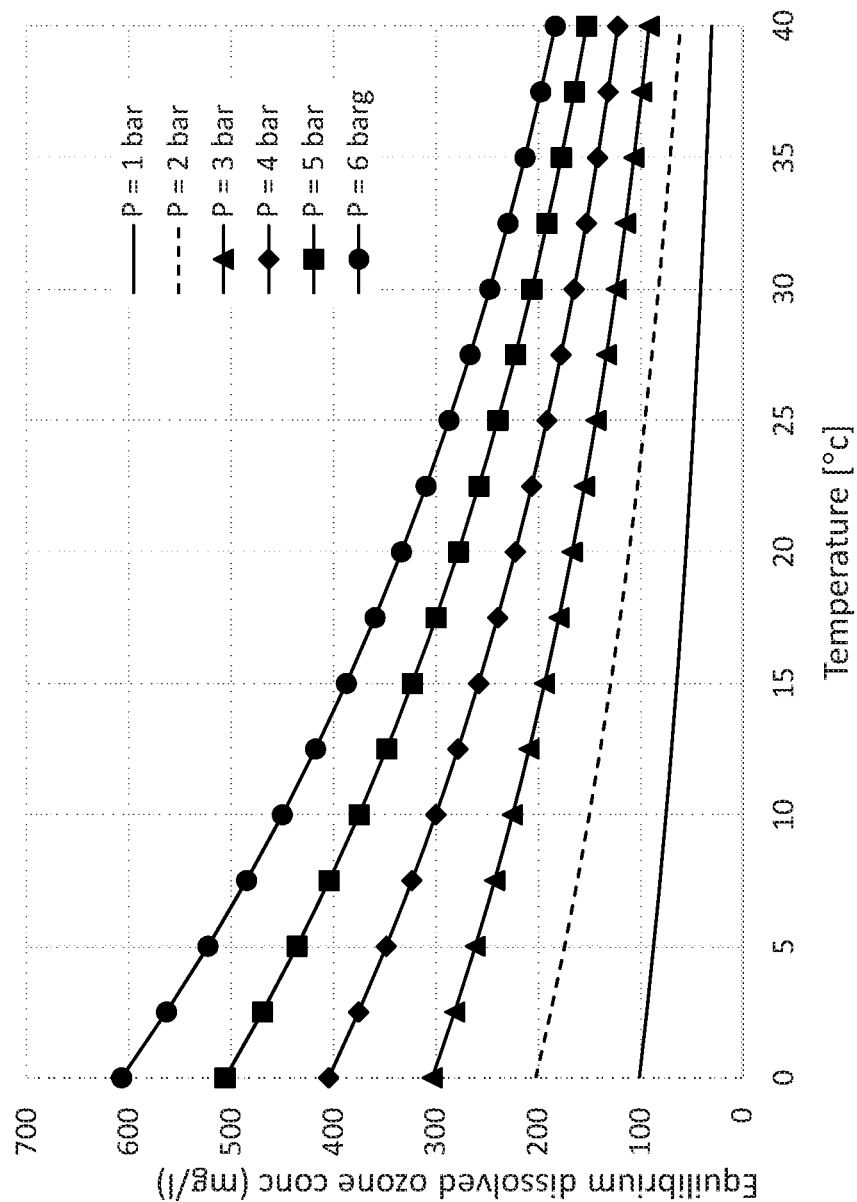
FIG. 2 is calculated results of ozone solubility in water depending on temperature and pressure.

The disclosed decoupling oxidation system separates the ozone oxidation process into three steps, that is, ozone dissolution (mass transfer), mixing and reaction steps. Regarding the step of ozone mass transfer, the ozone solubility is the greatest limiting factor in getting ozone to dissolve into water. Ozone solubility in water is expressed as the saturation point of ozone in water and dependent upon the temperature of water, concentration of ozone gas, pressure of water, the size of ozone gas bubbles, etc. FIG. 2 shows calculated results of the ozone solubility in water depending on temperature and pressure. It is seen that the kinetics of mass transfer from gaseous ozone to ozone dissolved in water increase as the pressure is increased in a reactor. Besides the pressure and the temperature of the water, it is found that the ozone solubility is also dependent on pH of water. A pH value below 7 favors ozone dissolved in water.

Figure 3:
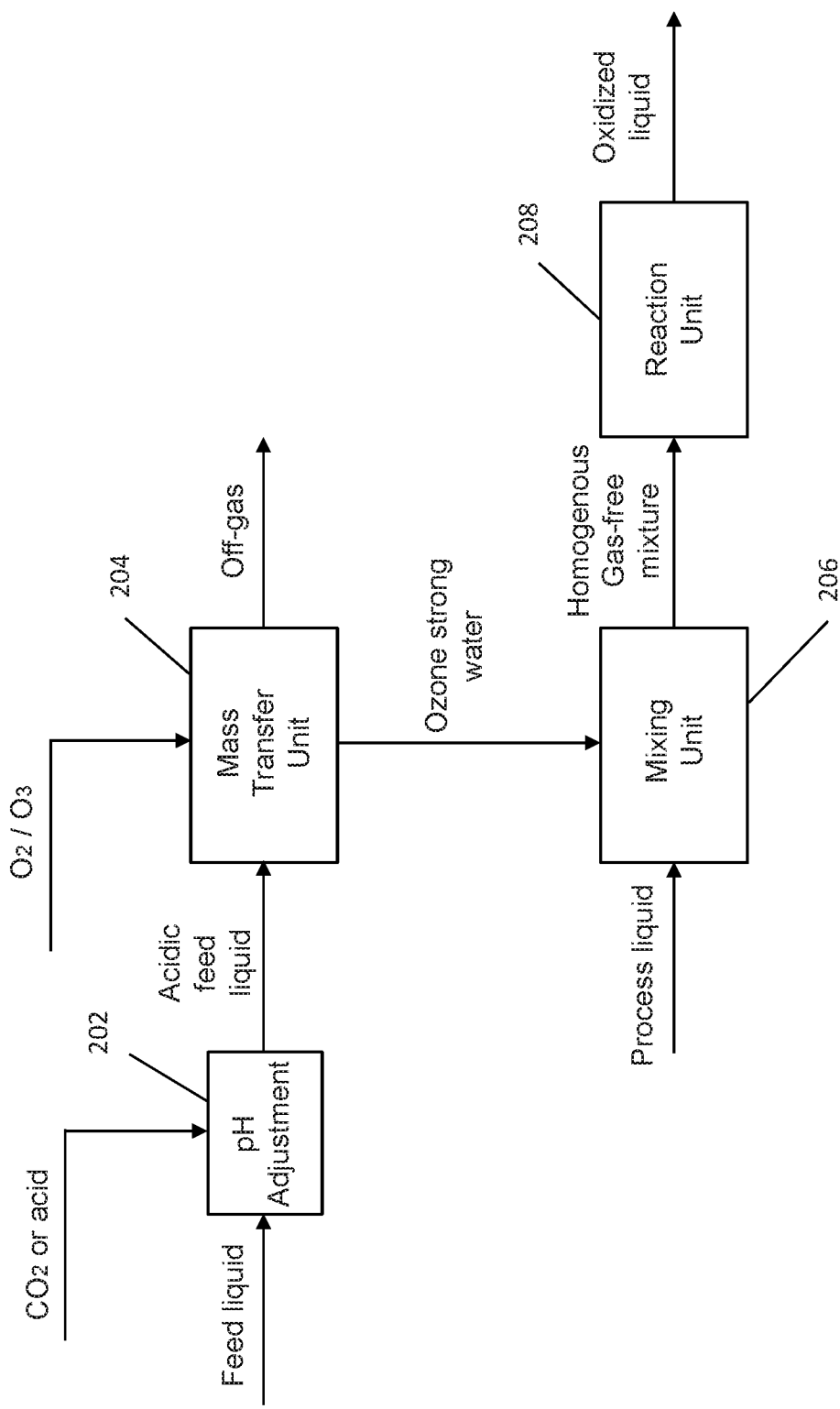
FIG. 3 is a block diagram of an exemplary embodiment of a decoupling oxidation system that separates an ozone oxidation process in liquid media into three unit operations for process optimization.
Figure 4:
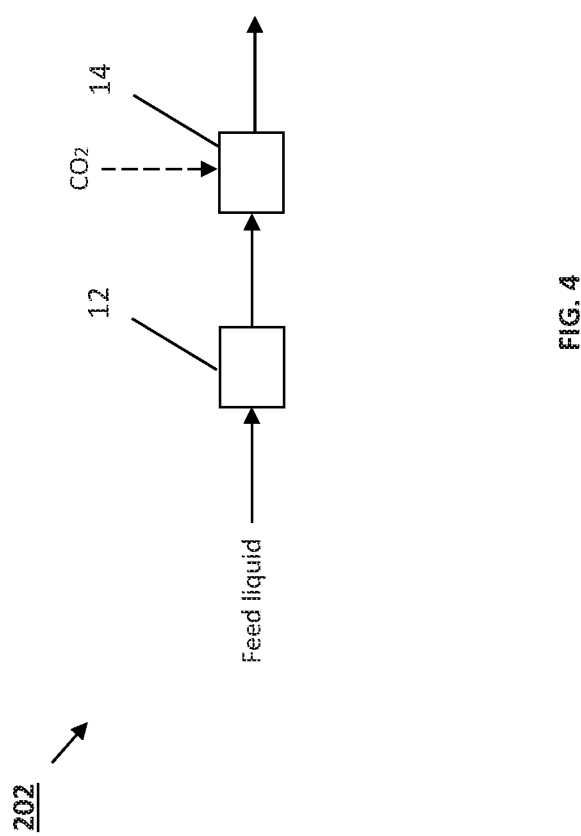
FIG. 4 is a block diagram of an exemplary pH adjustment device used in FIG. 3.

Referring to FIG. 3, there is shown a block diagram of an exemplary embodiment of the disclosed decoupling oxidation system comprising three separate units, a mass transfer unit 204, a mixing unit 206 and a reaction unit 208. The three separate units each are pressure vessels and fluidly connected in series. A pH adjustment device 202 feeds a pressurized acidic feed liquid to the mass transfer unit 204. The pH adjustment device 202 may include a pump 12 fluidly connected to a $CO_2$ gas injector 14, as shown in FIG. 4. Pump 12 is a high-pressure liquid pump provided for injecting a feed liquid into mass transfer unit 204. Here, influent, pressure and water level of mass transfer unit 204 are controlled by feedback control loops. The feed liquid is typically composed primarily of water, such as fresh water, tap water, process water, effluent water, municipal and industrial wastewater, wastewater already treated by the secondary treatment process, or the like. The feed liquid is pressurized by pump 12 and then passes through $CO_2$ gas injector 14 where $CO_2$ is injected into the pressurized feed liquid to achieve an acidic pH, which was experimentally confirmed to suppress the formation of OH free radicals by the dissociation of ozone dissolved in water thereby increasing the concentration of the dissolved $O_3$ ($dO_3$) in water later on. Those skilled in the art will recognize that mineral acids or other acids, other than $CO_2$ gas, may also be possible to provide an acidic pH for the feed liquid. $CO_2$ gas injector 14 may be a gas-liquid venturi nozzle that sucks $CO_2$ gas into the pressurized feed liquid stream if the available $CO_2$ gas pressure is lower than the pressure inside mass transfer unit 204. Returning to FIG. 3, a pressurized acidic feed liquid formed by the pH adjustment device 202 is fed into mass transfer unit 204, where ozone gas is diffused therein to produce the ozone strong water in mass transfer unit 204. The ozone gas may be generated by an ozone generator that converts oxygen gas to ozone gas. The ozone gas fed to mass transfer unit 204 is a gas mixture of ozone and unconverted oxygen.

For the purpose of producing the ozone strong water, the pH value of the water in mass transfer unit 204 is preferably maintained below 7 by adding $CO_2$ gas (or mineral acid or other acid) into the feed liquid. This is done by installing the $CO_2$ gas injector 14 in between pump 12 and mass transfer unit 204. The amount of $CO_2$ injected into the $CO_2$ gas injector 14 and the flow rate of the feed liquid may be continuously monitored and adjusted by suitable instrumentation.

In order to produce a maximum rate of ozone mass transfer, the pH value of water in mass transfer unit 204 is maintained preferably in a range of approximately 3 to 7. More preferably, the pH value of water in mass transfer unit 204 is approximately 3 to 5. Even more preferably, the pH value of water in mass transfer unit 204 is maintained at approximately 5. Even more preferably, the pH value of water in mass transfer unit 204 is maintained at approximately 4. One of ordinary skill in the art would recognize that the pH value may be adjusted by controlling a net flow of $CO_2$ into the pressurized feed liquid through the $CO_2$ gas injector 14.

Cooling coils incorporated into mass transfer unit 204 may be adjusted to maintain a temperature of water in mass transfer unit 204 at a desired constant level for producing the ozone strong water. Preferably, the temperature of mass transfer unit 204 ranges from 10° C. to 30° C. More preferably, the temperature of mass transfer unit 204 ranges from 15° C. to 25° C. Even more preferably, the temperature of mass transfer unit 204 is maintained at an ambient temperature, such as approximately 20° C. to achieve a targeted operation at optimized operational costs.

During a continuous operation of the disclosed decoupling oxidation system, mass transfer unit 204 is continuously filled with the pressurized acidic feed liquid. A body of the pressurized acidic liquid is formed in mass transfer unit 204. Preferably, the pressure of gas headspace of mass transfer unit 204 is maintained in a range of approximately 2 to 7 barg. More preferably, the pressure of the gas headspace of mass transfer unit 204 is maintained in a range of approximately 3 to 6 barg. Even more preferably, the pressure of the gas headspace of mass transfer unit 204 is maintained at approximately 5 barg. Correspondingly, the pressure of the water feed into mass transfer unit 204 pumped by pump 12 is slightly larger than the pressure of the gas headspace in mass transfer unit 204 in order to feed the water into mass transfer unit 204. While producing the ozone strong water, an off-gas stream containing ozone and oxygen is vented out from mass transfer unit 204, which may be recycled back to mass transfer unit 204 for reuse as ozone feed or coupling back to secondary wastewater treatment solution for use as an oxygen feed, because the off-gas stream coming out of mass transfer unit 204 has a pressure higher than ambient pressure. The pressure of the gas headspace or internal pressure of the mass transfer unit is adjustable by controlling a flow rate of the off-gas. In this way, a pressure of ozone strong water produced in mass transfer unit 204 is in a range of approximately 2 to 7 barg. More preferably, the pressure of the ozone strong water produced in mass transfer unit 204 is in a range of approximately 3 to 6 barg. Even more preferably, the pressure of the ozone strong water produced in mass transfer unit 204 is at approximately 5 barg.

Figure 1:
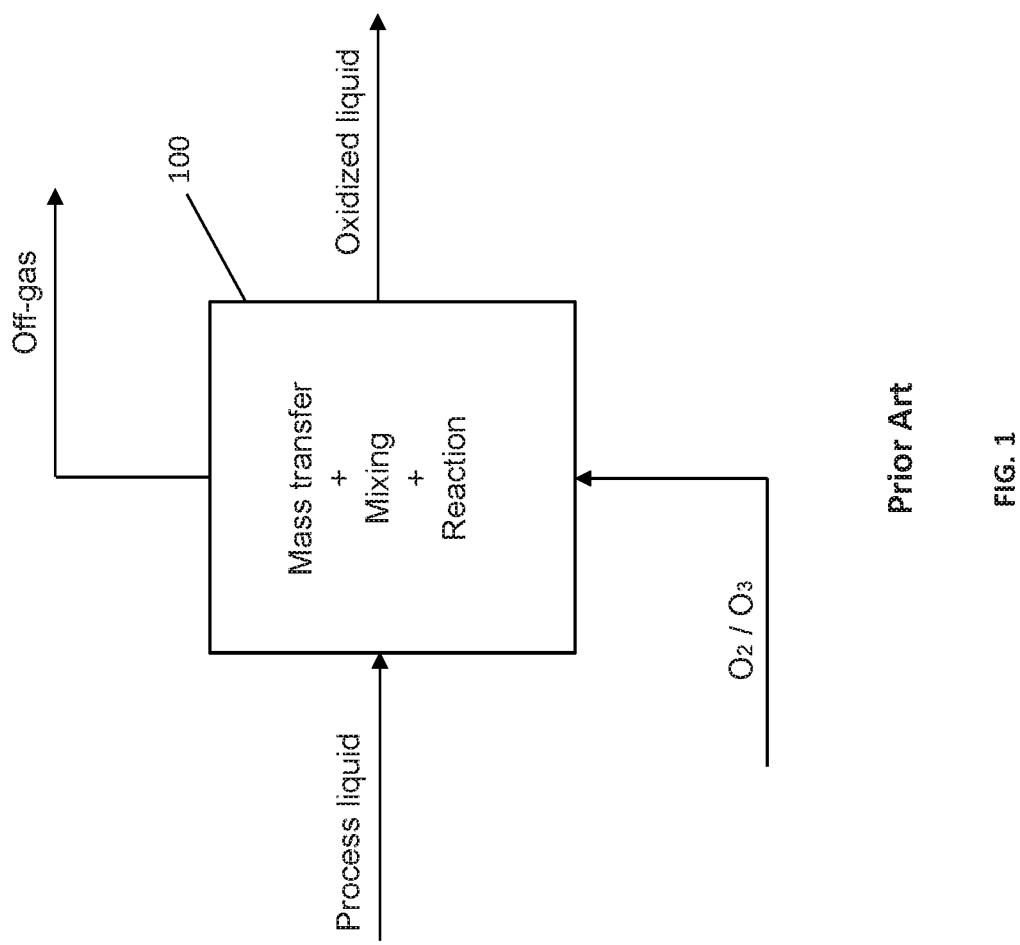
FIG. 1 is a block diagram of a common ozone reactor system designed to have all three processes of dissolution (mass transfer), mixing and reaction in a single reactor 100.

Mass transfer unit 204 may include a single stage of ozonation process having one reactor. Mass transfer unit 204 may include two stages of ozonation process having two reactors, in which one of the two reactors is a pre-ozonation reactor utilizing the recycled off-gas stream containing ozone and oxygen. Mass transfer unit 204 may increase the achievable steady-state concentration of ozone dissolved in water greater than approximately 150 mg/L, preferably up to approximately 200 mg/L, more preferably up to approximately 300 mg/L. The high concentration of dissolved ozone in water at elevated pressures may correspond to saturation or close to saturation concentration of dissolve ozone in water. When the pressure drops, the concentration of the dissolved ozone in water may be supersaturated. The production of the ozone strong water may take approximately 20 mins. In addition, mass transfer unit 204 may be much smaller in volume than the common ozone reactor system as shown in FIG. 1. For example, an approximately 20 $m^3$ reactor used in the disclosed decoupling oxidation system could be equivalent to an approximately 333 $m^3$ reactor used in common ozone reactor system for generating the same amount of dissolved ozone.

The flow rate of the pressurized acidic feed liquid fed to mass transfer unit 204 and the flow rate of the produced ozone strong water delivered out of the mass transfer unit 204 may be adjusted to maintain the volume of the liquid in mass transfer unit at an approximately constant level during a continuous operation. The flow rate of the pressurized acidic feed liquid fed to mass transfer unit 204 and the flow rate of the produced ozone strong water delivered out of the mass transfer unit 204 may be approximately the same. The produced ozone strong water is then fed to mixing unit 206 where it is mixed with a process liquid fed thereto. The ozone strong water is mixed with the process liquid to form a homogeneous mixture of the ozone strong water and the process liquid for oxidation of micropollutants, killing microorganisms, or any similar oxidation processes. Here, the process liquid is typically composed primarily of water, such as fresh water, tap water, process water, effluent water, municipal and industrial wastewater, wastewater already treated by the secondary treatment process, or the like. The process liquid carries components which should be oxidized through a liquid oxidization process. The pressure of the process liquid forwarded to mixing unit 206 ranges, but is not limited to, between 0.1 barg and 1.6 barg. Additionally, in one embodiment, the feed liquid and the process liquid may be from the same source.

Mixing unit 206 may have liquid inlets for injecting the produced ozone strong water and the process liquid therein, respectively. Mixing unit 206 includes a pressure vessel or pipe and a mixer. The pressure pipe is fluidly connected to the mixer. An injection device is coupled with the pressure pipe. The process liquid passes through the pressure pipe. The ozone strong water is injected into the main flow of the pressure pipe by the injection device. The ozone strong water and the process liquid may be injected into mixing unit 206 simultaneously. The flow rate of the ozone strong water injected into mixing unit 206 may be different from the flow rate of the process liquid fed to mixing unit 206. The disclosed mixing unit is designed to eliminate degassing ozone gas while mixing the ozone dissolved gas with the process liquid. The disclosed mixing unit is able to deliver a homogeneous and gas-free mixture of the ozone strong water and the process liquid to reaction unit 208. The ozone strong water injection step preferably should be as quick as possible to limit the amount of degassing prior to the mixer in the mixing unit 206. Otherwise excessive degassing of ozone might occur as the pressure of mixing unit 206 is lower than that of mass transfer unit 204. That is, the pressure of mixing unit 206 is maintained in a range of approximately 0 to 5 barg. More preferably, the pressure of mixing unit 206 is maintained in a range of approximately 0.5 to 1.5 barg. The time for mixing process may take approximately 1 to 5 seconds. A quick dilution of the ozone strong water in the process liquid may take within approximately 1 second or less than 1 seconds.

During injection process, some degassing may occur. In this case, the ozone gas may be dissolved back into water again in the mixer.

One of ordinary skill in the art will recognize that the disclosed mixing unit may be used to mix any liquid oxidants with the process liquid for a liquid oxidation process to convert the process liquid into an oxidized liquid.

The mixture of the ozone strong water and the process liquid produced in mixing unit 206 is then fed to reaction unit 208 where a liquid oxidation process takes place and the process liquid is converted into an oxidized liquid. The pressure of the reaction unit 208 is lower than that of the mixing unit 206 and maintained at approximately 1 bar or at atmosphere pressure. The reaction time in reaction unit 208 may take approximately 5 minutes.

The pressure of the ozone strong water when forwarded from mass transfer unit 204 to mixing unit 206 may range between 3 barg to 10 barg, based on operation conditions of mass transfer unit 204. The pressure of the process liquid forwarded to mixing unit 206 may range between 0.1 barg and 1.6 barg, depending on conditions of reaction unit 208. The pressure of the produced homogeneous and gas-free mixture of the process liquid and the gas-free liquid oxidant generated in mixing unit 206 may range between 0.1 barg and 1.5 barg that depends mainly on conditions downstream of reaction unit 208. A great pressure drop occurs in the mixing unit. Thus, mixing unit 206 provides a pressure transition or a pressure buffer from mass transfer unit 204 where high pressure ozone kinetics takes place to reaction unit 208 where the oxidization process is performed at around atmosphere pressure. Mixing unit 206 reduces the pressure pf the ozone strong water to the pressure of the process liquid (e.g., from 6 bar to 1 bar) that avoids degassing thereby preventing ozone loss from dissolved ozone. One of ordinary skill in the art will recognize that if reaction unit 208 may be pressurized to maintain the pressure of the process liquid to further mitigate against ozone degassing in some embodiments.

For example, the pressure in reaction unit 208 may be maintained at a pressure equivalent to the pressure of the ozone strong water coming out of mass transfer unit 204, in which case, mixing unit 206 may even be omitted. For example, if the pressure of the ozone strong water is maintained at 5 barg, and the pressure of the process liquid is also maintained at 5 barg, then a mixing unit may not be needed.

Figure 5:
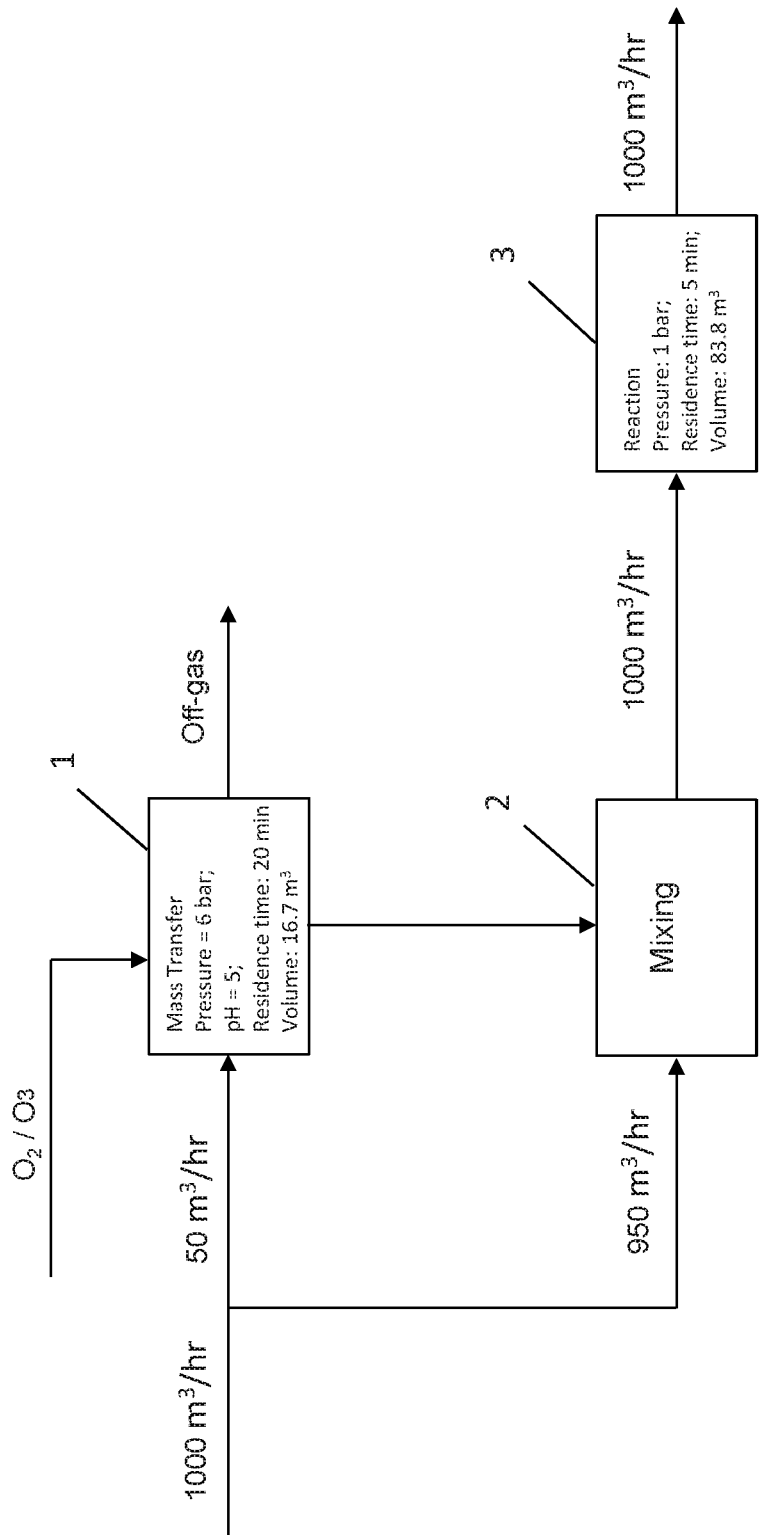
FIG. 5 is a block diagram of an exemplary embodiment of a decoupling oxidation system with specified operation conditions.

Furthermore, the sum of the sizes of mass transfer unit 204 and reaction unit 208 is much less than that of a single reactor, shown in FIG. 1. The size of mixing unit 206 compared to the sizes of mass transfer unit 204 and reaction unit 208 may be omitted. For example, ozonation of 1000 m$^3$/hr of water in a single tank system with 20 min residence time requires a tank volume of 333 m$^3$ at atmosphere pressure for the entire oxidation process including dissolution and reaction processes. In comparison, as shown in FIG. 5, with a flow rate of 50 m$^3$/hr. of feed liquid into mass transfer unit 1, a residence time of 20 minutes, a pressure of 5 barg and a pH 5, an approximately 200 mg/L of ozone strong water is achieved with a tank volume of 16.7 m$^3$ of mass transfer unit 1. The produced ozone strong water is then mixed with 950 m$^3$/hr of process liquid in mixing unit 2 and the mixture is forwarded to reaction unit 3. With a 5 min residence time under 1 bar, a tank volume of 83.3 m$^3$ is required for a flow rate of 1000 m$^3$/hr of oxidized liquid. Total volume requirement of the disclosed decoupling system is 16.7 m$^3$+83.3 m$^3$=100 m$^3$, which is much smaller than the tank volume of 333 m$^3$ of the single tank system.

Besides performing oxidization process in reaction unit 208 using ozone strong water as an oxidant, other processes, such as, disinfection process, may also take place in reaction unit 208 using ozone strong water.

In a continuous operation mode, the flow rates of the liquids at various stages are under control. The flow rate of the feed liquid fed to mass transfer unit 204, the flow rate of the ozone strong water coming out of mass transfer unit 204 and the flow rate of the ozone strong water feeding to mixing unit 206 are approximately the same, which maintains about a constant volume of the pressurized acidic water in mass transfer unit 204. The flow rate of the mixture coming out of mixing unit 206 is related to the flow rate of the process liquid fed to mixing unit 206. The flow rate of the oxidized liquid coming out of reaction unit 208 is preferably controlled to be approximately the same as the flow rate of the mixture fed to the reacting unit 208 over time. The volumes of the three units are designed to ensure the oxidized liquid is continuously produced from the disclosed decoupling oxidation system.

There are advantages of the disclosed decoupling oxidation system compared to a conventional system (e.g., FIG. 1). The disclosed decoupling oxidation system in some embodiments utilizes an acidic feed liquid to generate ozone dissolved in water having a higher ozone concentration at the saturated or nearly saturated concentration (the steady state dissolved ozone levels). The disclosed decoupling oxidation system utilizes smaller pressure vessels than the conventional systems that saves space and is easy to operate and easy to control. The disclosed decoupling oxidation system is able to recycle the oxygen/ozone gas in the off-gas stream for reuse or coupling back to secondary wastewater treatment solution. The disclosed decoupling oxidation system thus has the potential to integrate with existing wastewater treatment solutions that use oxygen gas. In addition, the disclosed decoupling oxidation system may require less starting ozone generation due to the increased efficiency in ozone dissolution and productive oxidations, which significantly reduces energy costs (a primary cost factor in operation of ozonation based process liquid treatment systems). Since the entire oxidation process includes multiple processes each having various adjustable factors, the disclosed decoupling oxidation system is a flexible in process control. The disclosed decoupling oxidation system separates the mixing process and the reaction process from the ozone dissolved generation process, which improves the reaction kinetics of the oxidation taking place in the reaction unit. Furthermore, the disclosed decoupling oxidation system exploits high pressure ozone kinetics through pressurizing the feed liquid, which benefits to increase the concentration of ozone dissolved in water.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A method for producing an oxidized liquid, the method comprising the steps of:
    generating an ozone strong water in a pressurized reactor comprising a step of bubbling gaseous ozone through a volume of water in the pressurized reactor, wherein the ozone strong water is a pressurized gas-free high concentrated or saturated or close to saturated ozonated water, which under atmospheric conditions is supersaturated, wherein a steady state concentration of ozone in the ozone strong water is greater than approximately 150 mg/L;
    making a quick dilution of the ozone strong water in a process liquid to avoid degassing, wherein a pressure of the ozone strong water is higher than a pressure of the process liquid;
    mixing the diluted ozone strong water with the process liquid in a mixer to form a homogeneous and gas-free mixture of the ozone strong water and the process liquid;
    forwarding the homogeneous and gas-free mixture to a reactor; and
    producing the oxidized liquid in the reactor.

2. The method of claim 1, further comprising the steps of:
    injecting $CO_2$ gas or a mineral acid into a pressurized feed water configured and adapted to form an acidic feed water;
    feeding the pressurized acidic feed water into the pressurized reactor configured and adapted to form a body of pressurized acidic water for generating the ozone strong water therein.

3. The method of claim 2, wherein the feed liquid includes fresh water, tap water, process water, effluent water, municipal and industrial wastewater, wastewater already treated by secondary treatment process.

4. The method of claim 2, wherein the feed liquid and the process liquid are from the same source.

5. The method of claim 2, further comprising the step of:
    recycling ozone gas from a pressurized off-gas stream from the pressurized reactor for use as ozone feed to the pressurized reactor; and/or
    recycling oxygen gas from the pressurized off-gas stream from the pressurized reactor for use as oxygen feed to a secondary wastewater treatment process.

6. The method of claim 1, wherein a pH value of the ozone strong water is in a range of 3<pH>7.

7. The method of claim 1, wherein a pH value of the ozone strong water is about 5.

8. The method of claim 1, wherein a pH value of the ozone strong water is about 4.

9. The method of claim 1, wherein a pressure of the ozone strong water ranges from 2 barg to 7 barg.

10. The method of claim 1, wherein the process liquid includes fresh water, tap water, process water, effluent water, municipal and industrial wastewater, wastewater already treated by secondary treatment process.

11. The method of claim 1, wherein the steady state concentration of ozone in the ozone strong water ranges from approximately 150 mg/L to approximately 300 mg/L.

12. A liquid oxidation system for producing an oxidized liquid, the system comprising:
    a pressurized reactor, configured and adapted to generate an ozone strong water by bubbling gaseous ozone through a volume of water in the pressurized reactor, wherein the ozone strong water is a pressurized gas-free high concentrated or saturated or close to saturated ozonated water, which under atmospheric conditions is supersaturated, wherein a steady state concentration of ozone in the ozone strong water is greater than approximately 150 mg/L;
    a liquid pump, fluidly connected to the pressurized reactor and integrating with a pipe through which a process liquid flows, configured and adapted to create a flow of the ozone strong water into a mixer, wherein a pressure of the ozone strong water is higher than a pressure of the process liquid;
    the mixer, fluidly connected to the pipe and the liquid pump, configured and adapted to mix the ozone strong water with the process liquid to form a homogeneous and gas-free mixture of the ozone strong water and the process liquid; and
    a reactor, fluidly connected to the mixer, configured and adapted to receive the homogeneous and gas-free mixture and produce an oxidized liquid therein.

13. The system of claim 12, wherein the liquid pump is connected to an acidic source and configured and adapted to form a pressurized acidic feed liquid and further configured and adapted to feed to the pressurized reactor to generate the ozone strong water under acidic conditions.

14. The system of claim 13, wherein $CO_2$ gas or a mineral acid is injected into a pressurized feed liquid that flows through the liquid pump connected to the acidic source configured and adapted to form the pressurized acidic feed liquid.

15. The system of claim 12, wherein a pH of the ozone strong water is below 7.

16. The system of claim 12, wherein a pH of the ozone strong water is about 5.

17. The system of claim 12, wherein a pH of the ozone strong water is about 4.

18. The system of claim 12, wherein the pressure inside the first reactor ranges from 2 to 7 barg.

19. The system of claim 12, wherein the quick dilution of the ozone strong water in the process liquid takes within approximately 1 second or less than 1 seconds.

20. A method for liquid oxidation process using liquid oxidants, the method comprising the steps of:
generating the liquid oxidant in a pressurized reactor comprising a step of bubbling gaseous oxidant through a volume of water in the pressurized reactor;
making a quick dilution of the liquid oxidant in a process liquid to avoid degassing, wherein the liquid oxidant is a pressurized gas-free high concentrated or saturated or close to saturated gaseous oxidant dissolved water, which under atmospheric conditions is supersaturated, wherein a pressure of the liquid oxidant is higher than a pressure of the process liquid, wherein a steady state concentration of gaseous oxidant in the liquid oxidant is greater than approximately 150 mg/L;
mixing the diluted liquid oxidant with the process liquid in a mixer to form a homogeneous and gas-free mixture of the liquid oxidant and the process liquid;
forwarding the homogeneous and gas-free mixture to a reactor; and
producing an oxidized liquid in the reactor.

21. The method of claim 20, wherein the gaseous oxidant is ozone or oxygen.

\* \* \* \* \*